US010223162B2

(12) United States Patent
Clark et al.

(10) Patent No.: US 10,223,162 B2
(45) Date of Patent: Mar. 5, 2019

(54) MECHANISM FOR RESOURCE UTILIZATION METERING IN A COMPUTER SYSTEM

(71) Applicant: Advanced Micro Devices, Inc., Sunnyvale, CA (US)

(72) Inventors: Michael T. Clark, Austin, TX (US); Jay Fleischman, Fort Collins, CO (US); Thaddeus S. Fortenberry, Dripping Springs, TX (US); Maurice B. Steinman, Marlborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 280 days.

(21) Appl. No.: 15/097,859

(22) Filed: Apr. 13, 2016

(65) Prior Publication Data
US 2017/0031719 A1    Feb. 2, 2017

Related U.S. Application Data

(60) Provisional application No. 62/197,465, filed on Jul. 27, 2015.

(51) Int. Cl.
| | |
|---|---|
| *G06F 12/12* | (2016.01) |
| *G06F 9/50* | (2006.01) |
| *G06F 12/0875* | (2016.01) |
| *G06F 12/0811* | (2016.01) |
| *G06F 9/455* | (2018.01) |

(52) U.S. Cl.
CPC ........ *G06F 9/5016* (2013.01); *G06F 9/45558* (2013.01); *G06F 12/0811* (2013.01); *G06F 12/0875* (2013.01); *G06F 2009/4557* (2013.01); *G06F 2009/45579* (2013.01); *G06F 2009/45583* (2013.01); *G06F 2009/45591* (2013.01); *G06F 2212/283* (2013.01)

(58) Field of Classification Search
CPC . G06F 9/5016; G06F 9/45558; G06F 12/0875
USPC ....................................................... 711/122
See application file for complete search history.

(56) References Cited

U.S. PATENT DOCUMENTS

| | | | |
|---|---|---|---|
| 5,913,043 A | 6/1999 | Carter et al. | |
| 6,564,280 B1 | 5/2003 | Walsh | |
| 6,571,318 B1 * | 5/2003 | Sander ................ | G06F 12/0862 711/137 |
| 6,760,852 B1 | 7/2004 | Gulick | |

(Continued)

*Primary Examiner* — Jae U Yu
(74) *Attorney, Agent, or Firm* — Meyertons Hood Kivlin Kowert and Goetzel PC; Rory D. Rankin

(57) ABSTRACT

Systems, apparatuses, and methods for tracking system resource utilization of guest virtual machines (VMs). Counters may be maintained to track resource utilization of different system resources by different guest VMs executing on the system. When a guest VM initiates execution, stored values may be loaded into the resource utilization counters. While the guest VM executes, the counters may track the resource utilization of the guest VM. When the guest VM terminates execution, the counter values may be written to a virtual machine control block (VMCB) corresponding to the guest VM. Scaling factors may be applied to the counter values to normalize the values prior to writing the values to the VMCB. A cloud computing environment may utilize the tracking mechanisms to guarantee resource utilization levels in accordance with users' service level agreements.

17 Claims, 8 Drawing Sheets

(56) References Cited

U.S. PATENT DOCUMENTS

| | | |
|---|---|---|
| 7,844,758 B1 | 11/2010 | Hughes |
| 8,392,640 B2 | 3/2013 | Housty |
| 2006/0123416 A1* | 6/2006 | Cibrario Bertolotti ...................... G06F 9/45533 718/1 |

* cited by examiner

MECHANISM FOR RESOURCE UTILIZATION METERING IN A COMPUTER SYSTEM

PRIORITY INFORMATION

This application claims benefit of priority of U.S. Provisional Application Ser. No. 62/197,465 titled "Mechanism for Resource Utilization Metering in a Computer System" filed Jul. 27, 2015, which is hereby incorporated by reference in its entirety as though fully and completely set forth herein.

BACKGROUND

Technical Field

Embodiments described herein relate to virtualization and more particularly, to resource utilization monitoring and control in a virtualization environment.

Description of the Related Art

Virtualization has been used in computer systems for a variety of different purposes. It is common in virtualization to execute privileged software in a "container" to prevent the privileged software from directly accessing and/or making changes to at least some of the physical machine state without first being permitted to do so by a virtual machine manager (VMM) (or hypervisor) that controls the virtual machine. Privileged programs may include operating systems, and may also include other software which expects to have full control of the hardware on which the software is executing.

Generally, virtualization of a processor or computer system may include providing one or more privileged programs with access to a virtual machine (the container mentioned above) over which the privileged program has full control, but the control of the physical machine is retained by the hypervisor. The virtual machine may include a processor (or processors), memory, and various peripheral devices that the privileged program expects to find in the machine on which it is executing. The virtual machine elements may be implemented by hardware that the hypervisor allocates to the virtual machine, at least temporarily, and/or may be emulated in software. Each privileged program (and related software in some cases, such as the applications that execute on an operating system) may be referred to herein as a guest.

Virtualization is also increasingly being used in cloud computing environments. Cloud computing refers to the use of a network of servers hosted on a public network (e.g., the Internet) to provide computing services to one or more users. For example, the resources of physical servers in server farms can be bundled and sold to customers as blocks of service in the form of processing power, memory, and storage. The types of resource units that are sold to customers may vary from embodiment to embodiment. For example, one type of resource unit may be denoted as a single virtual processor. A single virtual processor may represent an amount of processing power which is actually provided by different cores on a physical processor, different processors on the same physical server, or processing cores on different physical servers. Other resource units (e.g., cache space, memory space, memory bandwidth, I/O bandwidth) may be provided in a similar fashion.

When providing virtualization services to a large number of guest virtual machines (VMs), loading a cloud-based system to maximize a performance parameter (e.g., memory utilization, CPU utilization) may result in contention that impacts the performance achievable by a given customer's VM, breaking service level agreement (SLA) terms, which could have financial consequences. Accordingly, cloud resources are often kept under-utilized just to ensure there is enough headroom to guarantee the performance levels specified in SLAs or other agreements.

SUMMARY

Systems, apparatuses, and methods for performing virtual machine resource utilization metering are contemplated.

A mechanism may be implemented for monitoring and reporting the utilization of various system resources (e.g., CPU, GPU, caches, memory) by virtual machines (VMs) on a per-VM basis. In various embodiments, monitoring and reporting may be utilized in a data center for the purposes of customer billing and maximizing system utilization while satisfying service level agreements (SLAs). The data center software may assign tracking resources to track the resource utilization of a plurality of guest VMs. If the resource utilization levels guaranteed in a SLA are not being provided to a first plurality of guest VMs, the software may restrict the resource utilization of a second plurality of guest VMs executing in the data center. The data center may allocate the resources among the entirety of guest VMs to achieve optimal resource utilization while ensuring the levels guaranteed in the SLAs are being provided to the corresponding guest VMs.

In one embodiment, in order to track resource usage while an operating system of a guest VM is running, one or more processors may maintain a set of control registers and a set of counters related to the control registers. The control registers may be used to select the particular event(s) for each counter to count. The control registers may also perform any rate scaling for the counter, if desired. There may be a control register and a set of counters for various units or components such as the processor core, the Last Level Cache (LLC) (e.g., L3 cache), the Memory Fabric, and the IO Fabric.

In one embodiment, the control register and counters may be stored in a virtual machine control block (VMCB) when the virtual CPU (vCPU) is not running (i.e., they may be considered part of the VM's context or state). When the hypervisor (i.e., host) starts a virtual CPU (e.g., using the VMRUN command or the like), the traditional processor state may be stored in an area of memory such as the VMCB. The amount of state data stored in the VMCB may be extended to include the new control registers and counters, which may then be reloaded from memory and written into the hardware on the VMRUN. More generally, this state could also be managed separately from the hardware-managed VMCB context, by having hypervisor software save and restore each element of guest state. While the guest executes, the counters may continue to accumulate new information on the physical CPU(s) and other hardware. When the guest reaches an event that causes it to exit to the hypervisor (e.g., VMEXIT), the processor may save the counter values to the VMCB with the rest of the processor state. More generally, a hypervisor could instead save the register contents on VM exit.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Figure 1:
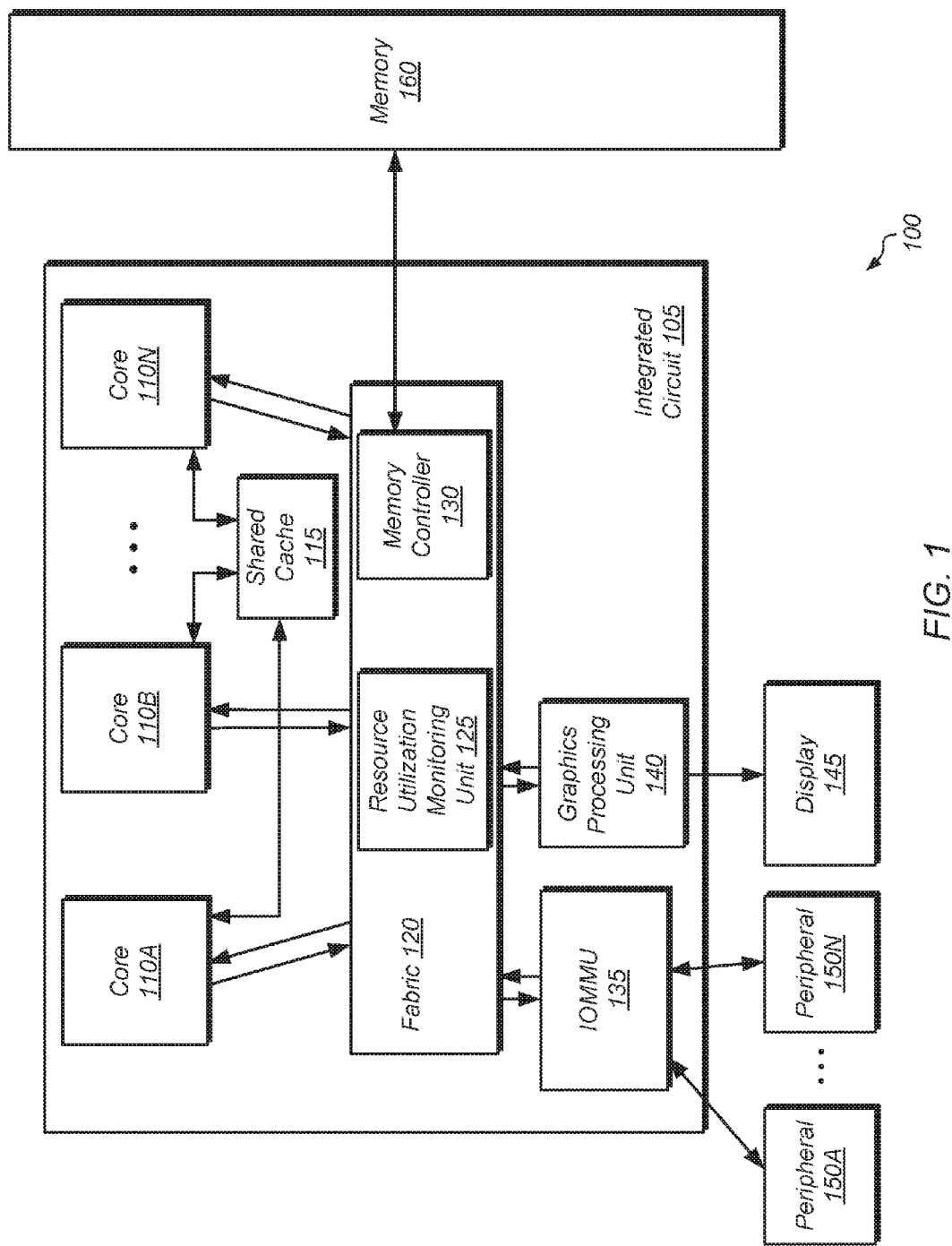
FIG. 1 is a block diagram of one embodiment of a computing system.

FIG. 1 is a block diagram of a computer system 100, in accordance with some embodiments. In these embodiments, computer system 100 includes integrated circuit (IC) 105 coupled to memory 160. In some embodiments, IC 105 may be a system on a chip (SoC). In some embodiments, IC 105 may include a plurality of processor cores 110A-N. In other embodiments, IC 105 may include a single processor core 110. In multi-core embodiments, processor cores 110 may be identical to each other (i.e., symmetrical multi-core), or one or more cores may be different from others (i.e., asymmetric multi-core). Processor cores 110 may each include one or more execution units, cache memories, schedulers, branch prediction circuits, and so forth. Furthermore, each of processor cores 110 may be configured to assert requests for access to memory 160, which may function as main memory for computer system 100. Such requests may include read requests and/or write requests, and may be initially received from a respective processor core 110 by communication fabric 120 (or simply "fabric" herein).

Input/output memory management unit (IOMMU) 135 is also coupled to fabric 120 in the embodiment shown. IOMMU 135 may function as a south bridge device in computer system 100. A number of different types of peripheral buses (e.g., peripheral component interconnect (PCI) bus, PCI-Extended (PCI-X), PCIE (PCI Express) bus, gigabit Ethernet (GBE) bus, universal serial bus (USB)) may be coupled to IOMMU 135. Various types of peripheral devices (not shown here) may be coupled to some or all of the peripheral buses. Such peripheral devices include (but are not limited to) keyboards, mice, printers, scanners, joysticks or other types of game controllers, media recording devices, external storage devices, network interface cards, and so forth. At least some of the peripheral devices that may be coupled to IOMMU 135 via a corresponding peripheral bus may assert memory access requests using direct memory access (DMA). These requests (which may include read and write requests) may be conveyed to fabric 120 via IOMMU 135.

In one embodiment, IOMMU 135 may include resource tracking logic (not shown) for tracking the utilization of I/O resources by the various guest VMs executing on system 100. For tracking I/O traffic, IOMMU 135 may include counters and use the process address space ID (PASID) to count events relative to the different guest VMs. If the I/O counters are enabled, a counter save instruction may be executed by a hypervisor to store the values of the I/O counters to memory. More generally, the hypervisor could read and save the counter values if directly managing elements of guest context.

In some embodiments, IC 105 includes a graphics processing unit (GPU) 140 that is coupled to display 145 of computer system 100. In some embodiments, GPU 140 may be an integrated circuit that is separate and distinct from IC 105. Display 145 may be a flat-panel LCD (liquid crystal display), plasma display, a light-emitting diode (LED) display, or any other suitable display type. GPU 140 may perform various video processing functions and provide the processed information to display 145 for output as visual information.

In some embodiments, memory controller 130 may be integrated into fabric 120. In some embodiments, memory controller 130 may be separate from fabric 120. Memory controller 130 may receive memory requests conveyed from fabric 120. Data accessed from memory 160 responsive to a read request may be conveyed by memory controller 130 to the requesting agent via fabric 120. Responsive to a write request, memory controller 130 may receive both the request and the data to be written from the requesting agent via fabric 120. If multiple memory access requests are pending at a given time, memory controller 130 may arbitrate between these requests.

In one embodiment, resource utilization monitoring unit 125 may be integrated into fabric 120. In other embodiments, resource utilization monitoring unit 125 may be separate from fabric 120 and/or resource utilization monitoring unit 125 may be implemented as multiple, separate components in multiple locations of IC 105. Resource utilization monitoring unit 125 may include one or more counters for tracking the utilization of various system resources of one or more guest virtual machines (VMs) executing on IC 105. The system resources which are monitored by resource utilization monitoring unit 125 may include one or more of memory bandwidth, memory capacity, input/output (I/O) bandwidth, fixed function intellectual property (IP) usage, processor core time, instructions retired, floating point operations per second (FLOPs), cache bandwidth, cache capacity, and/or other resources.

In some embodiments, memory 160 may include a plurality of memory modules. Each of the memory modules may include one or more memory devices (e.g., memory chips) mounted thereon. In some embodiments, memory 160 may include one or more memory devices mounted on a motherboard or other carrier upon which IC 105 may also be mounted. In some embodiments, at least a portion of memory 160 is implemented on the die of IC 105 itself. Embodiments having a combination of the aforementioned embodiments are also possible and contemplated. Memory 160 may be used to implement a random access memory (RAM) for use with IC 105 during operation. The RAM implemented may be static RAM (SRAM) or dynamic RAM (DRAM). The type of DRAM that may be used to implement memory 160 includes (but is not limited to) double data rate (DDR) DRAM, DDR2 DRAM, DDR3 DRAM, and so forth.

Although not explicitly shown in FIG. 1, IC 105 may also include one or more cache memories that are internal to the processor cores 110. For example, each of the processor cores 110 may include an L1 data cache and an L1 instruction cache. In some embodiments, IC 105 includes a shared cache 115 that is shared by the processor cores 110. In some embodiments, shared cache 115 is an L2 cache. In some embodiments, each of processor cores 110 has an L2 cache implemented therein, and thus shared cache 115 is an L3 cache. In general, the various method and apparatus embodiments described herein may be applicable to a cache of any level that may be shared by multiple threads being executed, whether in a single core or across multiple cores. Cache 115 may be part of a cache subsystem including a cache controller.

Figure 2:
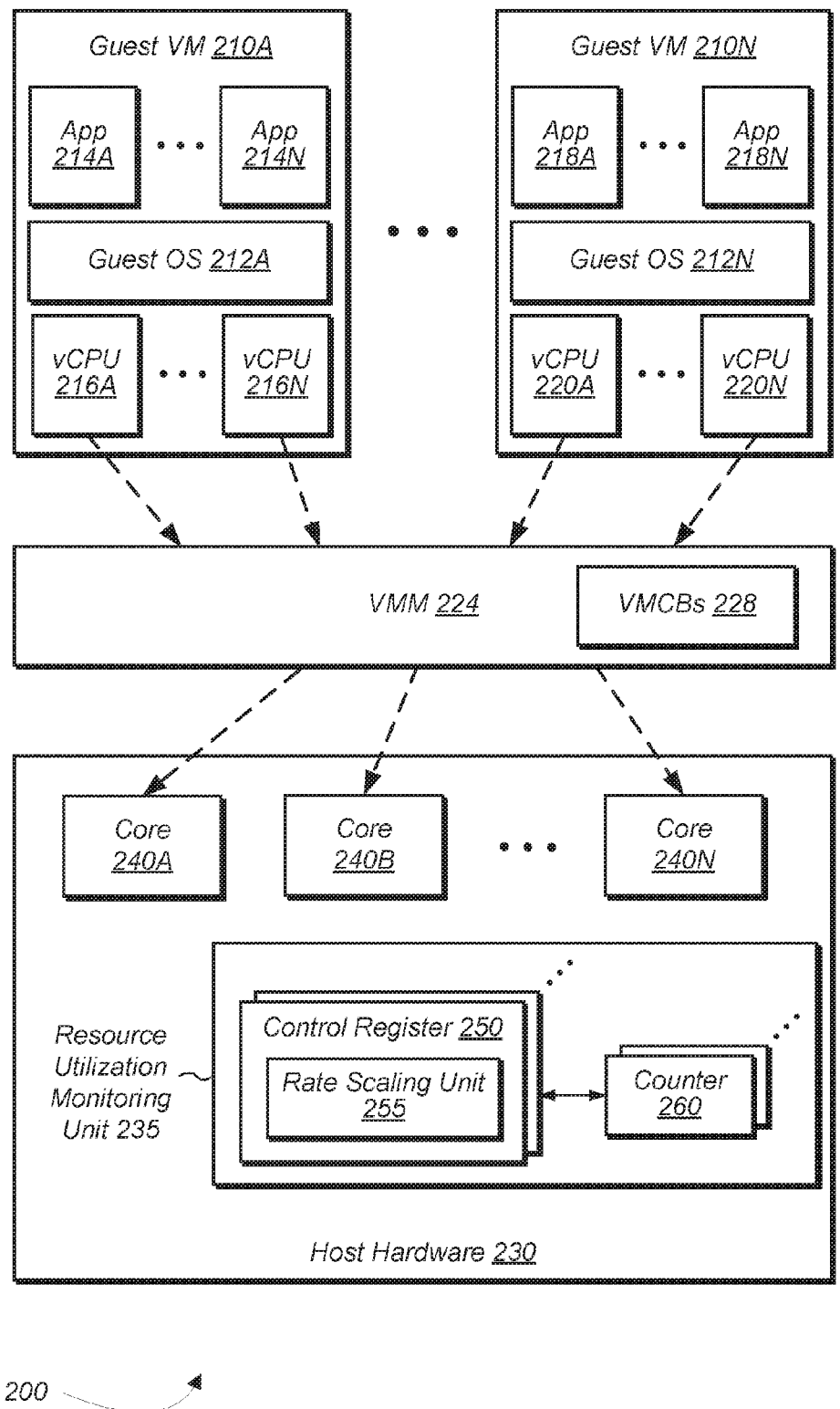
FIG. 2 is a block diagram of one embodiment of a computing system.

Turning now to FIG. 2, a block diagram of one embodiment of a computer system 200 that implements virtualization is shown. In the embodiment of FIG. 2, multiple guest virtual machines (VMs) 210A-210N are shown. Guest VM 210A includes a guest operating system (OS) 212A and one or more applications 214A-214N that run on the guest OS 212A. The guest OS 212A may be configured to assign processes associated with guest applications 214A-214N to virtual central processing units (vCPUs) 216A-216N. Similarly, guest VM 210N may include guest OS 212N which is configured to assign processes of guest applications 218A-218N to vCPUs 220A-220N. The guest VMs 210A-210N are representative of any number of guest VMs which may be executing on system 200. The guest VMs 210A-210N may be managed by a virtual machine manager (VMM) 224. The VMM 224 and the guest applications and OS's may execute on host hardware 230, which may comprise the physical hardware included in the computer system 200. In one embodiment, computer system 200 may be part of a cloud computing environment.

In one embodiment, the VMM 224 and guest VMs 210A-210N may maintain a set of virtual machine control blocks (VMCBs) 228. There may be one VMCB 228 for each guest VM 210A-210N. In another embodiment, there may be one VMCB 228 for each vCPU in each guest VM 210A-210N. While the VMCBs 228 are shown as part of the VMNI 224 for illustration in FIG. 2, the VMCBs 228 may be stored in memory, processor registers, and/or on non-volatile media in the host hardware 230 in other embodiments.

The host hardware 230 generally includes all of the hardware of the computer system 200. In various embodiments, the host hardware 230 may include one or more processors including cores 240A-N, memory, peripheral devices, storage, and other circuitry used to connect together the preceding components. For example, personal computer (PC)-style systems may include a fabric coupling the processors, the memory, and a graphics device that uses an interface such as a PCI Express Interface. Additionally, the fabric may couple to a peripheral bus such as the PCI bus, to which various peripheral components may be directly or indirectly coupled. A Southbridge may also be included, coupled to the PCI bus, to provide legacy functionality and/or couple to legacy hardware. In other embodiments, other circuitry may be used to link various hardware components. For example, HyperTransport™ (HT) links may be used to link nodes, each of which may include one or more processors, a host bridge, and a memory controller. Each node may also include a fabric. The host bridge may be used to couple, via HT links, to peripheral devices in a daisy chain fashion. Alternatively, many of the components may be included on a single device such as, for example, a single device that integrates one or more processors, fabric functionality and a graphics device. Any desired circuitry/host hardware structure may be used.

The VMNI 224 may be configured to provide the virtualization for each of the guest VMs 210A-210N. The VMNI 224 may also be responsible for scheduling vCPUs of the guest VMs 210A-210N for execution on the cores 240A-N of host hardware 230. The VMNI 224 may be configured to use the hardware support provided in the host hardware 230 for virtualization. For example, the processors may provide hardware support for virtualization, including hardware to intercept events and exit the guest to the VMM 224 for notification purposes. The device interrupt manager and/or guest interrupt control units in processors support virtualization as well.

In some embodiments, the VMM 224 may be implemented as a "thin" standalone software program that executes on the host hardware 230 and provides the virtualization for the guest VMs 210A-210N. Such a VMM implementation may sometimes be referred to as a "hypervisor". In other embodiments, the VMNI 224 may be integrated into or execute on a host OS. In such embodiments, the VMNI 224 may rely on the host OS, including any drivers in the host OS, platform system management mode (SMNI) code provided by the system BIOS, etc. Thus, the host OS components (and various lower-level components such as the platform SMM code) execute directly on the host hardware 230 and are not virtualized by the VMNI 224. The VMNI 224 and the host OS (if included) may together be referred to as the host, in one embodiment. Generally, the host may include any code that is in direct control of the host hardware 230 during use. For example, the host may be the VMNI 224, the VMNI 224 in conjunction with the host OS, or the host OS alone (e.g., in a non-virtualized environment).

In various embodiments, the VMM 224 may support full virtualization, paravirtualization, or both. Furthermore, in some embodiments, the VMNI 224 may concurrently execute guests that are paravirtualized and guests that are fully virtualized. With full virtualization, the guest VM 210A-210N is not aware that virtualization is occurring. Each guest VM 210A-210N may have contiguous, zero based memory in its VM, and the VMM 224 may use shadow page tables or nested page tables to control access to the host physical address space. The shadow page tables may remap from guest virtual addresses to host physical addresses (effectively remapping the guest "physical address" assigned by memory management software in the guest VM 210A-210N to host physical address), while nested page tables may receive the guest physical address as an input and map to the host physical address. Using the shadow page tables or nested page tables for each guest VM 210A-210N, the VMM 224 may ensure that guests do not access other guests' physical memory in the host hardware 230.

With paravirtualization, guest VMs 210A-210N may be at least partially VM-aware. Such guest VMs 210A-210N may negotiate for memory pages with the VMNI 224, and thus remapping guest physical addresses to host physical addresses may not be required. In one embodiment, in paravirtualization, guest VMs 210A-210N may be permitted to directly interact with peripheral devices in the host hardware 230. At any given time, a peripheral device may be "owned" by a guest VM or guest VMs 210A-210N. In one implementation, for example, a peripheral device may be mapped into a protection domain with one or more guest VMs 210A-210N that currently own that peripheral device. There may also be a protection mechanism to prevent devices in a protection domain from reading/writing pages allocated to a guest in another protection domain.

As mentioned previously, a VMCB 228 may be maintained for each guest VM 210A-210N and/or each vCPU in the guest. The VMCB 228 may generally include a data structure stored in a storage area that is allocated for the corresponding guest VM 210A-210N. In one embodiment, the VMCB 228 may include a page of memory, although other embodiments may use larger or smaller memory areas and/or may use storage on other media such as non-volatile storage. In one embodiment, the VMCB 228 may include the guest's processor state, which may be loaded into a processor in the host hardware 230 when the guest is scheduled to execute and may be stored back to the VMCB 228 when the guest exits (either due to completing its scheduled time, or due to an intercept or other event that the processor detects for exiting the guest). In various embodiments, the guest's processor state may include the values of performance monitoring counters (e.g., counter(s) 260) to track resource utilization of the guest.

In one embodiment, the VMM 224 may also have an area of memory allocated to store the processor state corresponding to the VMM 224. When the guest is scheduled for execution, the processor state corresponding to the VMNI 224 may be saved in this area. In one embodiment, the VMRUN instruction may be utilized to start execution of a guest. In other embodiments, other instructions may be utilized to start execution of a guest. When the guest exits to the VMM 224, the stored processor state may be reloaded to permit the VMM 224 to continue execution. In one implementation, for example, the processor may implement a register (e.g., a model specific register, or MSR) to store the address of the VMM 224 save area.

In one embodiment, the VMCB 228 may further include other control bits that may cause the processor to perform certain actions upon loading the VMCB 228. For example, the control bits may include indications to flush the TLB in the processor. Other control bits may specify the execution environment for the guest (e.g., interrupt handling modes, an address space identifier for the guest). Still other control bits may be used to communicate an exit code describing why the guest exited, etc.

Generally, a "guest" or "guest VM" may include any one or more software programs that are to be virtualized for execution in the computer system 200. A guest VM may include at least some code that executes in privileged mode, and thus expects to have full control over the computer system on which it is executing. Guest VM 210A is an example in which the guest VM includes a guest OS 212. The guest OS 212 may be any OS, such as Windows®, UNIX®, Linux®, etc. The guest VMs 210A-210N may also execute non-OS privileged code.

It is noted that the letter "N" when used herein in reference numerals such as 210N is meant to generically indicate any number of elements bearing that reference numeral (e.g., any number of guest VMs 210A-210N, including one guest VM). Additionally, different reference numerals that use the letter "N" (e.g., 210N and 214N) are not intended to indicate equal numbers of the different elements are provided (e.g., the number of guest VMs 210A-210N may differ from the number of applications 214A-214N) unless otherwise noted.

In various embodiments, VMM 224 may be configured to track resource utilization of the guest VMs 210A-N executing on host hardware 230. In one embodiment, VMM 224 may track resource utilization of the guest VMs 210A-N at least in part using information obtained by control register(s) 250 and counter(s) 260 of resource utilization monitoring unit 235. Each control register 250 may include a rate scaling unit 255 for converting between values tracked for different physical resources assigned to a given vCPU or guest VM over multiple execution periods. In some embodiments, upon the VMEXIT of a given vCPU, system 200 may save the advanced programmable interrupt controller (APIC) ID of the physical processor core the counter values were derived on. The VMM 224 may then use this APIC ID to tie the counters in the VMCB to the physical processor cores they were generated on. The VMM 224 may be responsible for accumulating the information for the multiple vCPUs that make up a complete guest VM. The VMM 224 may also use the APIC ID to deal with vCPU migration.

In one embodiment, the VMM 224 may be cognizant of the number of physical counters 260. The VMM 224 may use the full address space identifier (ASID) space but only a small number of "active" ASID's matching the number of physical counters may be tracked. On VMEXIT of a guest VM, the VMM 224 may dump the current occupancy for that ASID into the corresponding VMCB 228. In various embodiments, counter(s) 260 may include core counters to count instructions retired and/or clock cycles not halted, cache counters to count cache lines installed for a guest and/or cache access rate, fabric counters to track memory bandwidth utilized by a guest, and/or I/O counters to track I/O bandwidth consumed by a guest. In one embodiment, VMM 224 may be configured to provide parameters to host hardware 230 for restricting resource utilization by the various guest VMs executing on host hardware 230. Host hardware 230 may enforce utilization of various resources by the guest VMs to the levels specified by VMM 224. Accordingly, host hardware 230 may monitor the values of counters 260 and prevent a given guest VM from exceeding the resource utilization limits specified by VMM 224.

Figure 3:
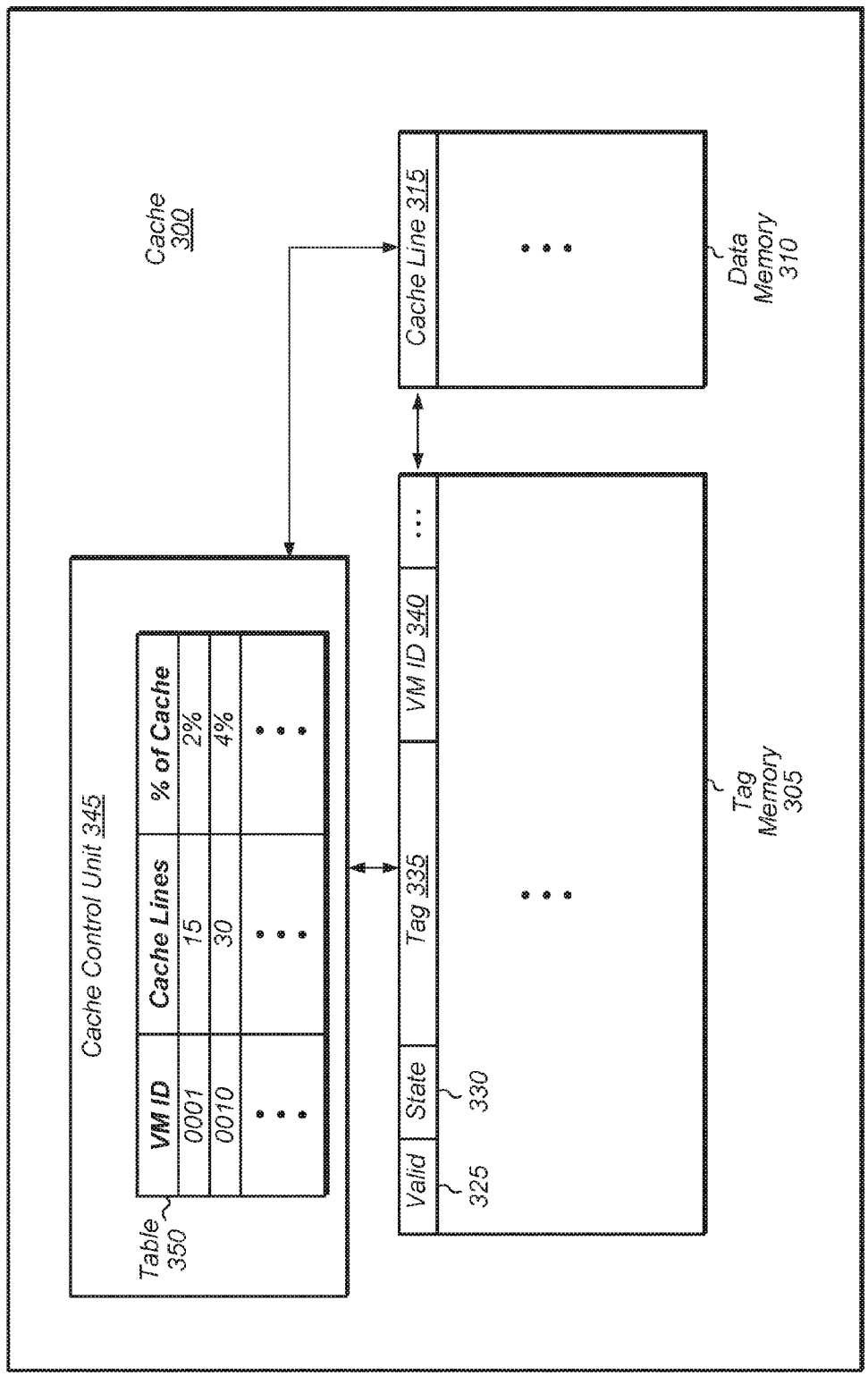
FIG. 3 is a block diagram of one embodiment of a cache.

Referring now to FIG. 3, a block diagram of one embodiment of a cache 300 is shown. Cache 300 may be located at any level of a memory hierarchy, depending on the embodiment. For example, in one embodiment, cache 300 may be implemented as the shared cache 115 of FIG. 1. Cache 300 may include tag memory 305, data memory 310, and cache control unit 345. Each entry of tag memory 305 may include a valid field 325, state field 330, tag field 335, VM ID field 340, and one or more other fields. In other embodiments, each entry of tag memory 305 may include other information and/or may be structured differently. Data memory 310 may be configured to store any number of cache lines (e.g., cache line 315), with the number of cache lines varying from embodiment to embodiment.

In one embodiment, cache 300 may be a Last Level Cache (LLC), and the occupancy of cache 300 may be tracked for guest VMs even when the guest VMs are not running. To facilitate such a mechanism, the cache lines may retain information such as a state element (e.g., in the tag) that tracks which guest VM was running when the cache line was requested from memory. This field is shown as VM ID 340 of tag memory 305. With this information, the processor can then track the occupancy of the cache for each guest VM as shown in table 350. Since processors typically support approximately 65,000 unique guests through the ASID, it may not be practical to support that much extra information per tag in cache 300 when the guests are not running. For each guest VM, the occupancy may be tracked as the guest VM is running and an exact value of its occupancy is saved on a VMEXIT. However, since a much lower number of unique values can be tracked when the guest is not running, the processor may choose a smaller number of non-active guests to track. In various embodiments, the hypervisor may execute an instruction to write to memory the current value of all guest cache occupancy counters being tracked. For example, in one embodiment, the values of table 350 may be written to memory for all VM ID entries when the hypervisor executes this instruction. In another embodiment, separate counters may be maintained for a given number of VM IDs, and the values of these counters may be written to memory by the hypervisor.

Table 350 may be maintained by cache control unit 345 in one embodiment. In other embodiments, table 350 may be maintained by system software, the processor, the hypervisor, or another control unit. Table 350 may be utilized to track the cache occupancy of the various guest VMs in use by the system. Although four bits of a VM ID are shown in table 350 to identify up to 16 different VMs, it should be understood that any number of bits may be utilized for VM IDs, depending on the embodiment. Any suitable portion of the VM ID may be utilized for identifying VM's in table 350. Each entry of table 350 may also include a number of cache lines per VM ID and the percentage of the cache 300 being utilized by the VM ID. In other embodiments, table 350 may include other data fields and/or be structured differently.

In one embodiment, the cache utilization of a predetermined number 'N' of VM guests may be monitored, with 'N' being any positive integer that may vary from embodiment to embodiment. If the number of active and non-active VM guests exceeds 'N', cache 300 may track the cache occupancy of the last 'N' active guest VMs. When a given guest VM is no longer active and gets pushed out of the last 'N' active guests by newly executing guests, all of the cache lines for the given guest VM may be evicted from cache 300. In another embodiment, the cache lines may not be evicted for a given guest VM when the guest VM is no longer one of the most recent 'N' guest VMs executing on the system, but the system may no longer be able to track the cache occupancy for the given guest VM. If queried on the cache occupancy for the given guest VM, the system software may return an indefinite or unknown indicator to denote the lack of tracking resources for monitoring the given guest VM.

Figure 4:
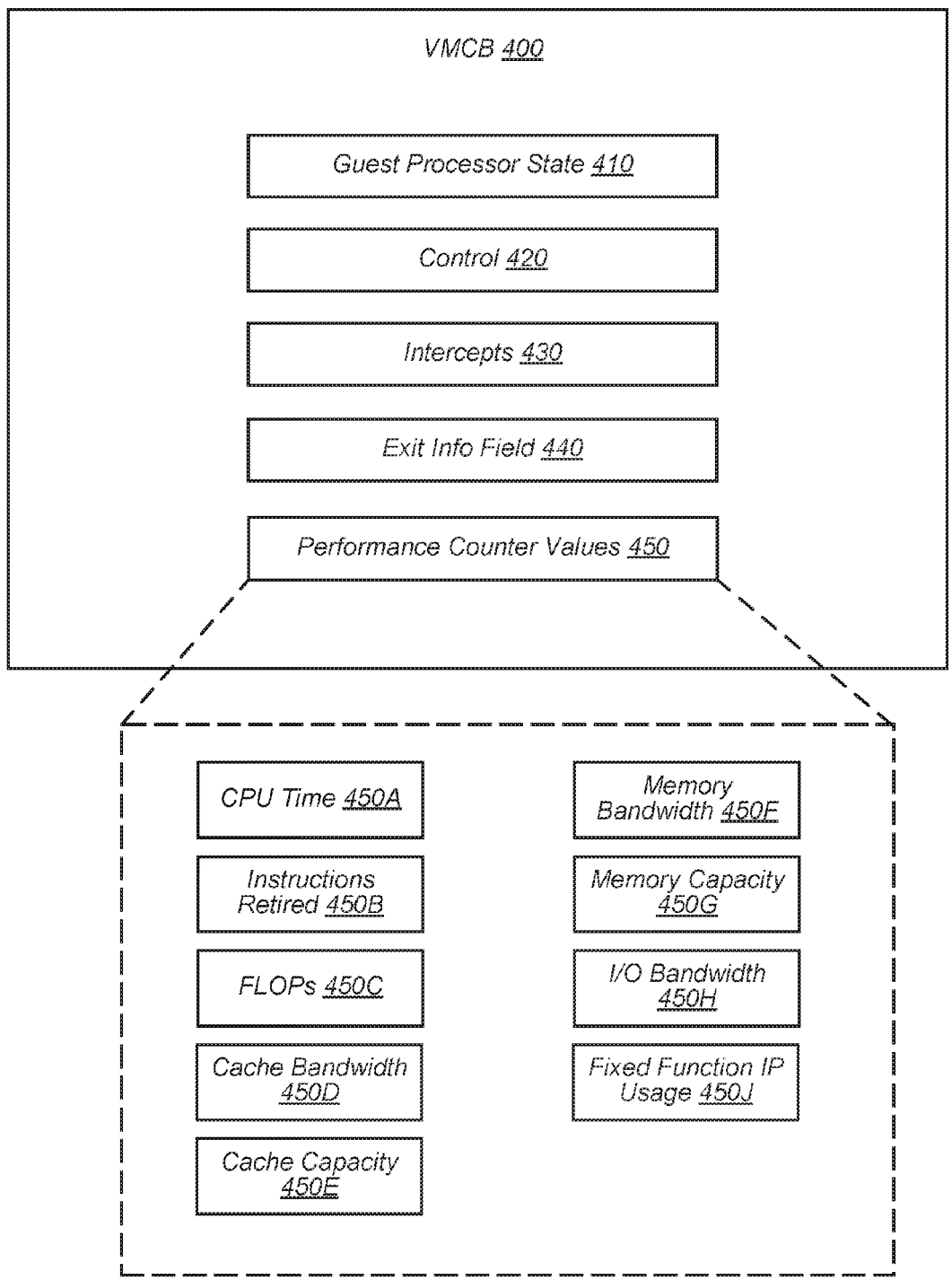
FIG. 4 is a block diagram of one embodiment of a VMCB.

Turning now to FIG. 4, a block diagram of one embodiment of a VMCB 400 is shown. In one embodiment, the contents of VMCB 400 may be included within VMCBs 228 of FIG. 2. The VMCB 400 may include a guest processor state 410, control data 420, intercepts 430, exit info field 440, and performance counter values 450. The guest processor state 410 may include an architected state that corresponds to the processor state at the point at which the guest last exited. The guest processor state 410 may also include an implementation-specific state (e.g., model specific registers). For example, the guest processor state 410 may include an implementation-specific state and/or architected state that is considered part of the processor's context. The guest processor state 410 may correspond to an initial state of the processor if the guest has not yet executed. The processor may load the state of the processor from the guest processor state 410 during execution of the VMRUN instruction. The processor may save the state from the processor to the guest processor state 410 during the guest exit. In one embodiment, the guest processor state 410 may be defined to store all of the processor state, while in other embodiments, the guest processor state 410 may be defined to store a portion of the processor state. Processor state not stored in the guest processor state 410 may be saved by the hypervisor in other memory locations (or may be recreated by the hypervisor). Any subset of the processor state may be included in the guest processor state 410.

The control data 420 may include any desired control information to be used when execution of the corresponding guest is initiated or exited. The control data 420 may include a guest exit code written by the processor upon guest exit to indicate the reason for guest exit. The intercepts 430 may specify which events are enabled for fault or trap. The intercepts 430 may define exits to the hypervisor, using the VMEXIT mechanism. Various intercepts may be defined in various embodiments. In one embodiment, at least some of the intercepts may be defined as intercept indications in the intercepts 430. Each indication may, e.g., be a bit which may enable the intercept when set or disable the intercept when clear. Other embodiments may assign the opposite meanings to the states of the bit or may use other indications. There may be one intercept indication in the intercepts 430 for each intercept event. After the processor has stored an indication of the instruction or other action which caused the trap in exit info field 440, the processor may exit to the hypervisor.

Performance counter values 450 may include a plurality of values associated with a given guest VM or a given vCPU of a guest VM, depending on the embodiment. A guest VM may include a plurality of performance counter values 450, and the guest VM may include a different set of performance counter values for a plurality of vCPUs in use by the guest VM. In various embodiments, the performance counter values 450 may include one or more of CPU time 450A, instructions retired 450B, floating point operations (FLOPs) 450C, cache bandwidth 450D, cache capacity 450E, memory bandwidth 450F, memory capacity 450G, I/O bandwidth 450H, and/or fixed function IP usage 450J.

Figure 5:
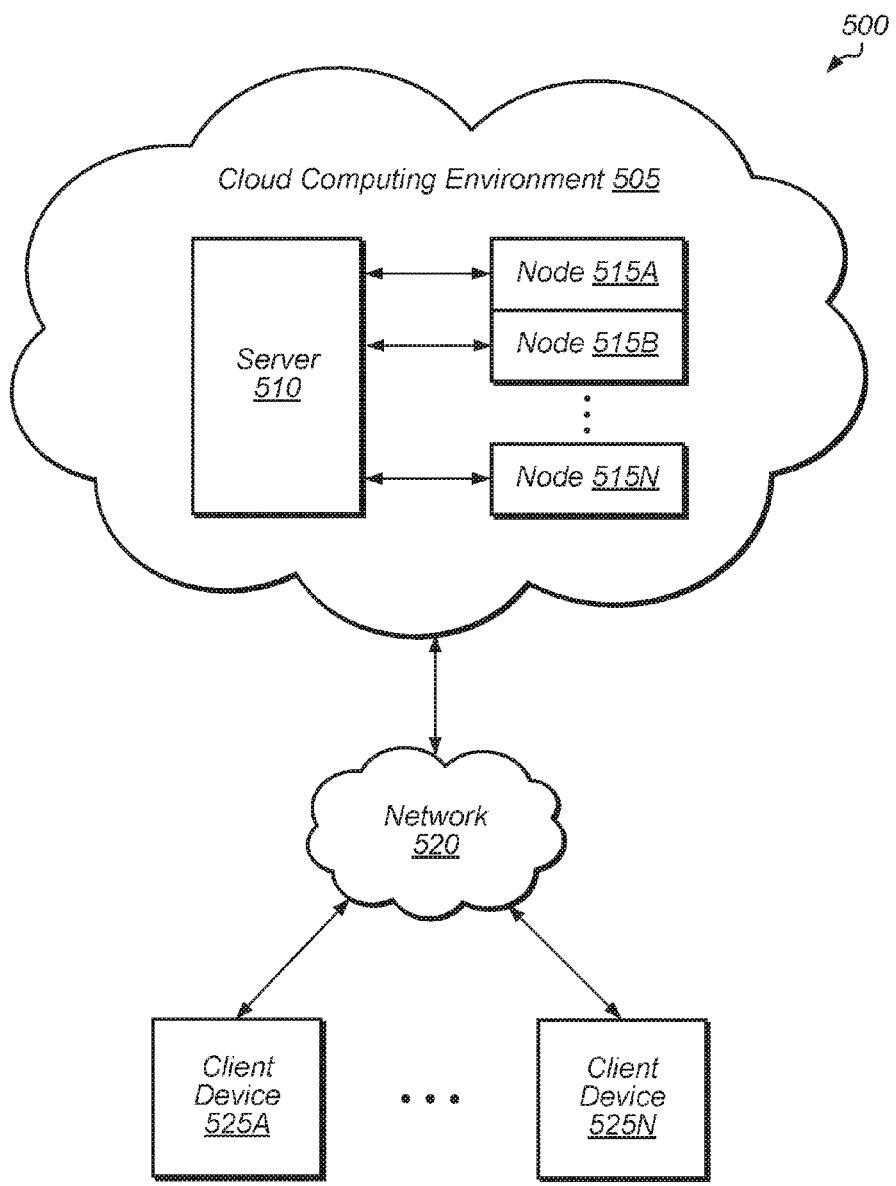
FIG. 5 is a block diagram of one embodiment of a cloud computing system.

Referring now to FIG. 5, a block diagram of one embodiment of a cloud computing system 500 is shown. System 500 may include cloud computing environment 505, network 520, and client devices 525A-N. Client devices 525A-N are representative of any number and type of client computing devices. Client devices 525A-N may be coupled to cloud computing environment 505 via network 520. Network 520 is representative of any number and type of networks, and network 520 may utilize a variety of techniques including wireless connection, direct local area network (LAN) connections, wide area network (WAN) connections such as the Internet, a router, storage area network, Ethernet, and others. Network 520 may further include remote direct memory access (RDMA) hardware and/or software, transmission control protocol/internet protocol (TCP/IP) hardware and/or software, router, repeaters, switches, grids, and/or others. Protocols such as Fibre Channel, Fibre Channel over Ethernet (FCoE), iSCSI, and so forth may be used in network 520. Network 520 may interface with a set of communications protocols used for the Internet such as the Transmission Control Protocol (TCP) and the Internet Protocol (IP), or TCP/IP.

Cloud computing environment 505 may include server 510 and nodes 515A-N, and cloud computing environment 505 may be configured to deliver computing as a service to client devices 525A-N. Server 510 is representative of any number and type of servers. Nodes 515A-N are representative of any number and type of compute nodes which may be managed by server 510. In various embodiments, one or more of nodes 515A-N may include a portion or the entirety of the circuitry and/or software components of system 100

(of FIG. 1) and/or system 200 (of FIG. 2). In various embodiments, cloud computing environment 505 may provide infrastructure, platforms and/or software services for various clients which do not maintain adequate resources on local client devices 525A-N.

Cloud computing environment 505 may provide various services to client devices 525A-N, depending on the embodiment. In one embodiment, cloud computing environment 505 may provide a virtualization environment for client devices 525A-N. One or more users may have service license agreements (SLAs) with the provider of cloud computing environment 505 to guarantee performance and/or certain level of resource utilization.

Cloud computing environment 505 may include in server 510 and/or one or more of nodes 515A-N hardware and software configured to track the resource utilization of various guest VMs executing within cloud computing environment 505. The hypervisor software and/or other applications may also be able to track the resource utilization of the guest VMs. Cloud computing environment 505 may be able to track the resource utilization of the guest VMs at a fine level of granularity using the software and/or hardware tracking mechanisms. These mechanisms may allow the cloud computing environment 505 to guarantee an expected level of service to the various guest VMs executing on the system 500. Cloud computing environment 505 may also achieve optimal resource utilization on the nodes 515A-N by using the monitoring and tracking resource utilization mechanisms.

In one embodiment, cloud computing environment 505 may track the resource utilization of the 'N' most recently active guest VMs, with 'N' being any positive integer. Cloud computing environment 505 may collect statistics on the guest VM resource utilization and ensure that the guest VMs are receiving their expected allotment of resources. If one or more guest VMs are over-utilizing one or more resources and preventing other guest VMs from receiving their expected allotment, then cloud computing environment 505 may be configured to restrict the one or more guest VMs' utilization of these resources.

Figure 6:
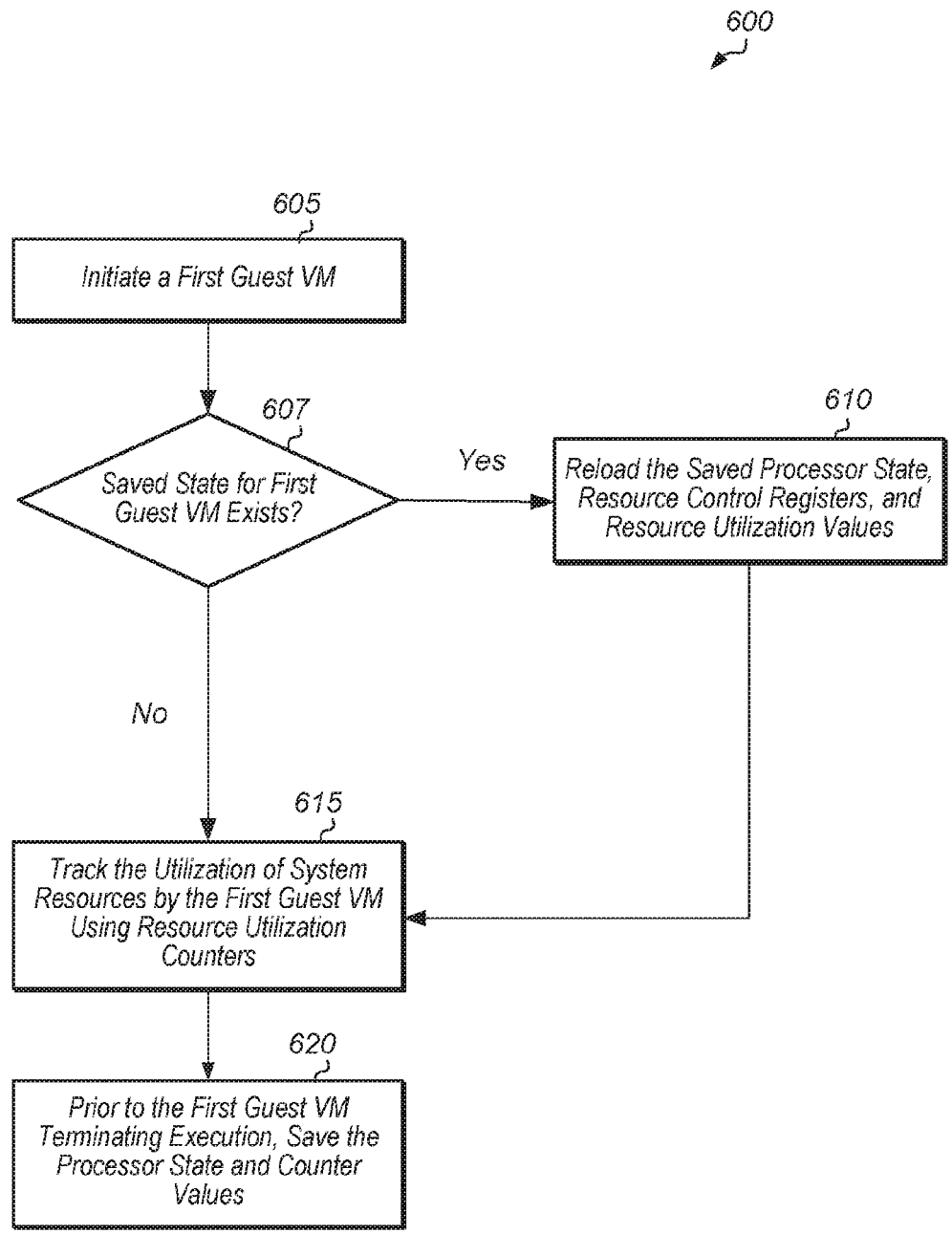
FIG. 6 is a generalized flow diagram illustrating one embodiment of a method for monitoring system resource utilization of a guest VM.

Turning now to FIG. 6, one embodiment of a method 600 for monitoring system resource utilization of a guest virtual machine (VM) is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems or processors described herein may be configured to implement method 600.

A first guest VM may be initiated on a computing system (block 605). In one embodiment, the first guest VM may be initiated using the VMRUN instruction. In response to initiating the first guest VM, if there is a saved state associated with the first guest VM, the saved processor state, resource control registers and resource utilization values associated with the first guest VM may be reloaded by the computing system (block 607) before beginning execution of the first guest VM. As the first guest VM is running, resource utilization counters may track the utilization of a plurality of system resources by the first guest VM (block 615). Prior to the first guest VM terminating execution (e.g., VMEXIT), the processor may save the processor state and resource utilization counters (block 620). In one embodiment, the processor may save the processor state and counter values to a virtual machine control block (VMCB) corresponding to the first guest VM. After block 620, method 600 may end.

Figure 7:
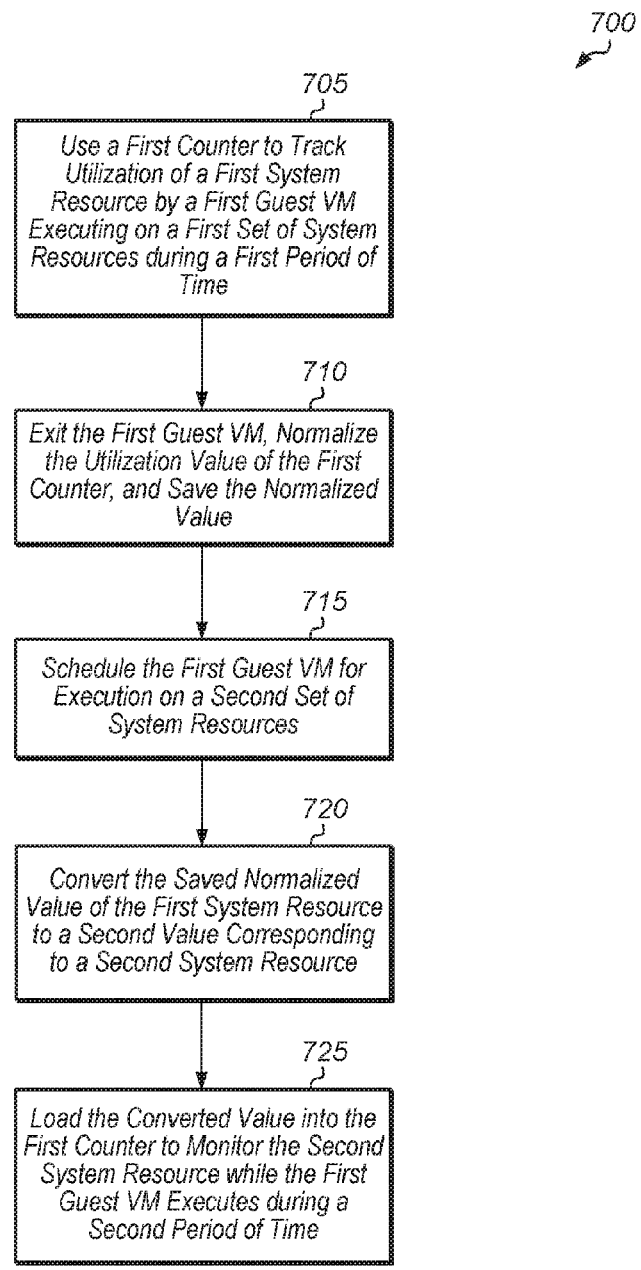
FIG. 7 is a generalized flow diagram illustrating one embodiment of a method for performing a rate conversion for resource utilization data.

Referring now to FIG. 7, one embodiment of a method 700 for performing a rate conversion for resource utilization data is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems or processors described herein may be configured to implement method 700.

A processor may use a first counter to track utilization of a first system resource by a first guest VM executing on a first set of system resources during a first period of time (block 705). In one embodiment, the first system resource may be CPU time on a first CPU operating at a first frequency. In other embodiments, the first system resource may be any of various other resources (e.g., cache occupancy, memory bandwidth, I/O bandwidth) operating at any of various frequencies. Next, the processor may exit the first guest VM, normalize the utilization value of the first system resource, and save the normalized value (block 710). In one embodiment, the processor may save the normalized value of the monitored first system resource and the indication of the first clock frequency in the VMCB corresponding to the first guest VM.

Then, at a later point in time, the hypervisor may schedule the first guest VM for execution on a second set of resources (block 715). The hypervisor may have a variety of resources available for scheduling a plurality of guest VMs, and the resources that are used by a given guest VM may change each time the given guest VM exits and then is restarted on the system. In response to scheduling the first guest VM for execution on the second set of resources, the processor may convert the saved normalized value of the first system resource to a second value corresponding to a second system resource (block 720). For example, if the second system resource is a second CPU running at a second frequency, then the processor may multiply the saved normalized value of the first system resource (i.e., a first CPU running at a first frequency) by the ratio of the second frequency divided by the first frequency. In other embodiments, for other monitored system resources, other suitable rate conversions may be performed. Next, the processor may load the converted value into the first counter to initialize the first counter for monitoring the second system resource while the first guest VM executes during a second period of time (block 725). After block 725, method 700 may end.

Figure 8:
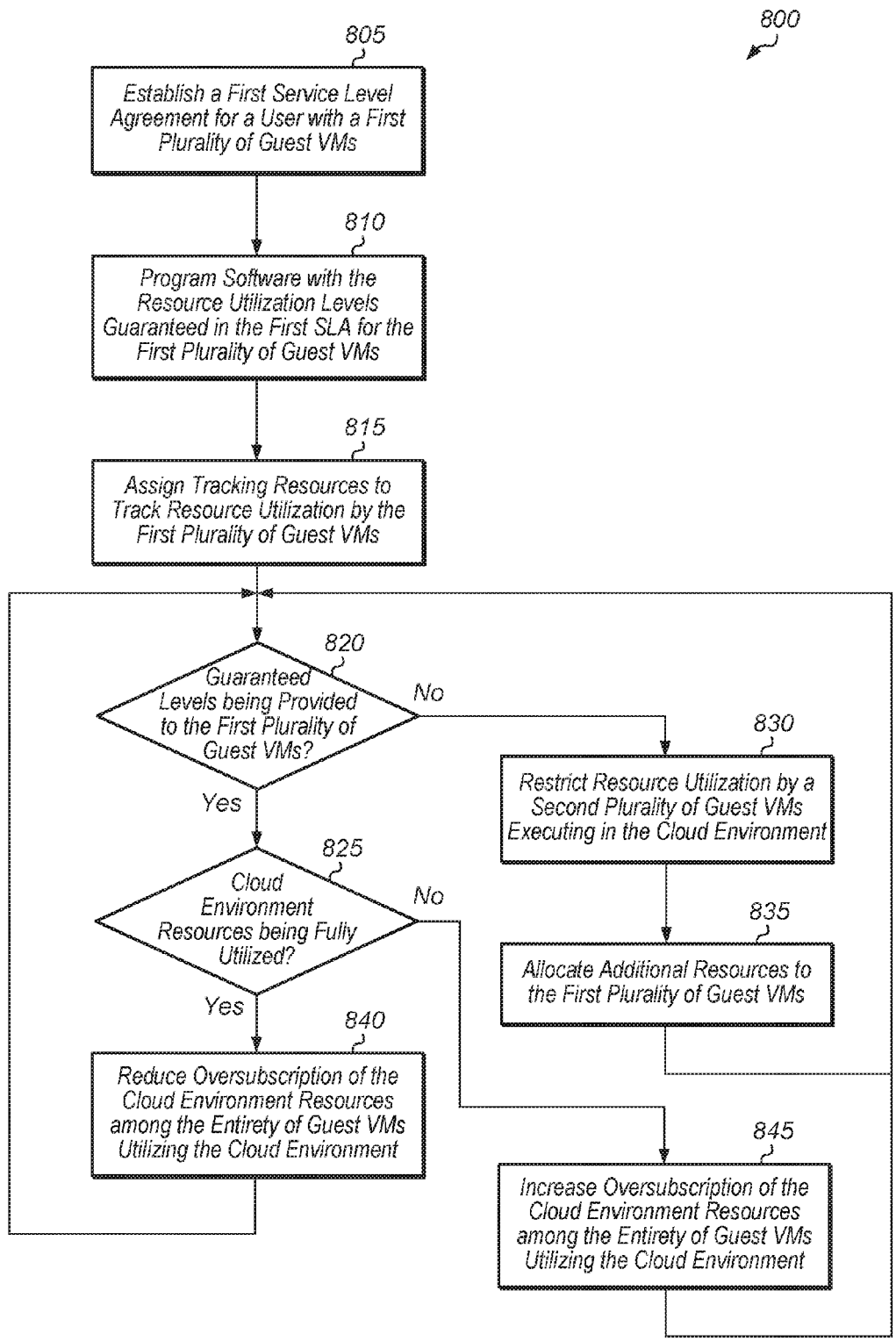
FIG. 8 is a generalized flow diagram illustrating one embodiment of a method for providing guaranteed levels of cloud-based resources to customers.

Turning now to FIG. 8, one embodiment of a method 800 for providing guaranteed levels of cloud-based resources to customers is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems or processors described herein may be configured to implement method 800.

A cloud service provider may establish a first service level agreement (SLA) for a user with a first plurality of guest VMs (block 805). System software may be programmed with the resource utilization levels guaranteed in the first SLA for the first plurality of guest VMs (block 810). The resource utilization levels specified in the first SLA may include one or more of CPU time, instructions retired, floating point operations (FLOPs), cache bandwidth, cache capacity, memory bandwidth, memory capacity, I/O bandwidth, and/or fixed function IP usage. Then, the hypervisor may assign tracking resources to track resource utilization by the first plurality of guest VMs (block 815). The tracking resources may include one or more resource control registers and one or more performance counters. Then, using the tracking resources, the hypervisor may determine if the guaranteed levels of resource utilization are being provided to the first plurality of guest VMs (conditional block 820). It is noted that in various embodiments the service provider may have standby resources available to ensure SLA terms are met. For example, if it appears various terms of a given agreement have been violated, or are at risk of being violated, the service provider may allocate additional resources to correct any deficiency or otherwise prevent a potential violation of terms. Such standby resources may include additional hardware resources, software resources, or any combination of the two.

If the guaranteed levels of resource utilization are being provided to the first plurality of guest VMs (conditional block 820, "yes" leg), then the system software may determine if the cloud environment resources are being fully utilized (conditional block 825). If the guaranteed levels of resource utilization are not being provided to the first plurality of guest VMs (conditional block 820, "no" leg), then the hypervisor may restrict (i.e., reduce) resource utilization by a second plurality of guest VMs executing in the cloud environment (block 830). The second plurality of guest VMs may include the other guest VMs executing in the cloud environment. Then, the hypervisor may allocate additional resources to the first plurality of guest VMs (block 835).

If the cloud environment resources are being fully utilized (conditional block 825, "yes" leg), then the system software may reduce oversubscription of the cloud environment resources among the entirety of guest VMs utilizing the cloud environment (block 840). If the cloud environment resources are not being fully utilized (conditional block 825, "no" leg), then the system software may increase oversubscription of the cloud environment resources among the entirety of guest VMs utilizing the cloud environment (block 845). After blocks 835, 840, and 845, method 800 may return to conditional block 820.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computing system during use to provide the program instructions and accompanying data to the computing system for program execution. The computing system may include at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A processor comprising:
one or more execution cores; and
one or more counters;
wherein the processor is configured to:
maintain a first counter to track utilization of a first resource while a first guest virtual machine (VM) is executing on the processor;
normalize a current value of the first counter, wherein normalizing the current value comprises modifying the current value to reflect an operating frequency of a physical processor executing the guest virtual machine;
store the current value of the first counter as normalized to a first memory location that corresponds to a first virtual machine control block of the first guest VM when the first guest VM terminates execution;
initialize the first counter to the current value stored in the first memory location, in response to re-scheduling the first guest VM for execution; and
maintain a virtual machine control block for each guest virtual machine, wherein the virtual machine control block for a given virtual machine includes one or more performance counter values including the first counter value.

2. The processor as recited in claim 1, wherein:
the processor is further configured to track utilization of a plurality of resources while the first guest VM is executing on the processor, and
the plurality of resources comprise at least two or more of cache occupancy, input/output (I/O) fabric bandwidth utilization, memory fabric bandwidth utilization, and core execution time.

3. The processor as recited in claim 1, wherein:
the processor further comprises a first cache; and
the first counter is configured to track a number of cache lines requested into the first cache while the first guest VM is executing.

4. The processor as recited in claim 3, wherein:
the first cache comprises a tag memory and a data memory; and
each tag in the tag memory comprises a guest VM identification (ID) field.

5. The processor as recited in claim 1, wherein:
the first guest VM has a first service level agreement (SLA) with a guarantee of a first resource utilization level; and
the processor is configured to determine if a value of the first counter meets the first resource utilization level guaranteed by the first SLA.

6. The processor as recited in claim 5, wherein the processor is further configured to restrict resource utilization by a second guest VM responsive to determining the value of the first counter does not meet the first resource utilization level guaranteed by the first SLA.

7. A method comprising:
maintaining a first counter to track utilization of a first resource while a first guest virtual machine (VM) is executing on the processor;
normalize a current value of the first counter, wherein normalizing the current value comprises modifying the current value to reflect an operating frequency of a physical processor executing the guest virtual machine;
storing the current value of the first counter as normalized to a first memory location that corresponds to a first virtual machine control block of the first guest VM when the first guest VM terminates execution;

initializing the first counter to the current value stored in the first memory location, in response to re-scheduling the first guest VM for execution; and maintaining a virtual machine control block for each guest virtual machine, wherein the virtual machine control block for a given virtual machine includes one or more performance counter values including the first counter value.

8. The method as recited in claim 7, further comprising:
tracking utilization of a plurality of resources while the first guest VM is executing on the processor;
wherein the plurality of resources comprise at least two or more of cache occupancy, input/output (I/O) fabric bandwidth utilization, memory fabric bandwidth utilization on a per-VM basis, and core execution time.

9. The method as recited in claim 7, wherein the processor further comprises a first cache, and the method further comprises tracking a number of cache lines requested into the first cache while the first guest VM is executing.

10. The method as recited in claim 9, wherein:
the first cache comprises a tag memory and a data memory; and
each tag in the tag memory comprises a first guest VM identification (ID) field.

11. The method as recited in claim 7, wherein:
the first guest VM has a first service level agreement (SLA) with a guarantee of a first resource utilization level; and
the method further comprises determining if a value of the first counter meets the first resource utilization level guaranteed by the first SLA.

12. The method as recited in claim 11, further comprising restricting resource utilization by a second guest VM responsive to determining the value of the first counter does not meet the first resource utilization level guaranteed by the first SLA.

13. A system comprising:
a memory; and
a processor comprising:
   one or more execution cores; and
   one or more counters;
wherein the processor is configured to:
   maintain a first counter to track utilization of a first resource while a first guest virtual machine (VM) is executing on the processor;
   normalize a current value of the first counter, wherein normalizing the current value comprises modifying the current value to reflect an operating frequency of a physical processor executing the guest virtual machine;
   store the current value of the first counter as normalized to a first memory location that corresponds to a first virtual machine control block of the first guest VM when the first guest VM terminates execution;
   initialize the first counter to the current value stored in the first memory location, in response to re-scheduling the first guest VM for execution; and
   maintain a virtual machine control block for each guest virtual machine, wherein the virtual machine control block for a given virtual machine includes one or more performance counter values including the first counter value.

14. The system as recited in claim 13, wherein:
the processor is further configured to track utilization of a plurality of resources while the first guest VM is executing on the processor; and
the plurality of resources comprise at least two or more of cache occupancy, input/output (I/O) fabric bandwidth utilization, memory fabric bandwidth utilization on a per-VM basis, and core execution time.

15. The system as recited in claim 13, wherein:
the processor further comprises a first cache; and
the first counter is configured to track a number of cache lines requested into the first cache while the first guest VM is executing.

16. The system as recited in claim 15, wherein:
the first cache comprises a tag memory and a data memory; and
each tag in the tag memory comprises a guest VM identification (ID) field.

17. The system as recited in claim 13, wherein:
the first guest VM has a first service level agreement (SLA) with a guarantee of a first resource utilization level; and
the processor is configured to determine if a value of the first counter meets the first resource utilization level guaranteed by the first SLA.

* * * * *